United States Patent
Thapliya et al.

(10) Patent No.: US 9,853,907 B2
(45) Date of Patent: Dec. 26, 2017

(54) INFORMATION PROCESSING SYSTEM, INFORMATION PROCESSING APPARATUS, AND NON-TRANSITORY COMPUTER READABLE MEDIUM

(71) Applicant: FUJI XEROX CO., LTD., Tokyo (JP)

(72) Inventors: Roshan Thapliya, Yokohama (JP); Chaoxin Hu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 157 days.

(21) Appl. No.: 14/885,574

(22) Filed: Oct. 16, 2015

(65) Prior Publication Data
US 2016/0043959 A1 Feb. 11, 2016

Related U.S. Application Data

(63) Continuation of application No. PCT/JP2014/057217, filed on Mar. 18, 2014.

(30) Foreign Application Priority Data

Aug. 6, 2013 (JP) .................................. 2013-163645

(51) Int. Cl.
*H04L 12/825* (2013.01)
*H04L 12/26* (2006.01)
(Continued)

(52) U.S. Cl.
CPC ............ *H04L 47/25* (2013.01); *H04L 43/087* (2013.01); *H04L 43/0829* (2013.01);
(Continued)

(58) Field of Classification Search
CPC ..... H04L 47/25; H04L 43/0829; H04L 47/12; H04L 47/283; H04L 47/11; H04L 47/263
See application file for complete search history.

(56) References Cited

U.S. PATENT DOCUMENTS 8,285,886 B1 10/2012 Vass
2002/0053053 A1 5/2002 Nagai et al.
(Continued)

FOREIGN PATENT DOCUMENTS

JP 2005-151600 A 6/2005
JP 2006-174419 A 6/2006
(Continued)

OTHER PUBLICATIONS

May 13, 2014 Written Opinion issued in International Patent Application No. PCT/JP2014/057217.
(Continued)

*Primary Examiner* — Afshawn Towfighi
(74) *Attorney, Agent, or Firm* — Oliff PLC

(57) ABSTRACT

An information terminal 10 successively receives a plurality of packets that configure distribution data from an information distribution server 20, and requests the information distribution server 20 to change a bit rate of the packets that configure the distribution data, if it is judged that congestion occurs in communication with the information distribution server 20 based on a change in time interval from transmission to reception of each of the successively received packets, and if it is judged that a packet loss rate, which is a rate of a loss packet corresponding to a loss included in the packets transmitted from the information distribution server 20 and calculated based on the successively received packets, is increased as compared with a value obtained by multiplying a packet loss rate before the packets that configure the distribution data are received, by a predetermined weight.

7 Claims, 7 Drawing Sheets

(51) Int. Cl.
*H04L 12/801* (2013.01)
*H04L 12/841* (2013.01)

(52) U.S. Cl.
CPC ............... *H04L 47/11* (2013.01); *H04L 47/12* (2013.01); *H04L 47/263* (2013.01); *H04L 47/283* (2013.01)

(56) References Cited

U.S. PATENT DOCUMENTS

| | | |
|---|---|---|
| 2005/0257111 A1 | 11/2005 | Nagai et al. |
| 2006/0015783 A1 | 1/2006 | Nagai et al. |
| 2006/0085725 A1 | 4/2006 | Nagai et al. |
| 2006/0126713 A1 | 6/2006 | Chou et al. |
| 2006/0143678 A1 | 6/2006 | Chou et al. |
| 2006/0165166 A1 | 7/2006 | Chou et al. |
| 2007/0223449 A1 | 9/2007 | Nagai et al. |
| 2007/0223503 A1 | 9/2007 | Nagai et al. |
| 2007/0223583 A1 | 9/2007 | Nagai et al. |
| 2007/0223584 A1 | 9/2007 | Nagai et al. |
| 2007/0223586 A1 | 9/2007 | Nagai et al. |
| 2008/0095247 A1 | 4/2008 | Ohno et al. |
| 2010/0316066 A1* | 12/2010 | Leung ............... H04N 21/44209 370/468 |
| 2014/0105036 A1* | 4/2014 | Anschutz ............ H04L 41/5019 370/252 |

FOREIGN PATENT DOCUMENTS

| | | |
|---|---|---|
| JP | 2012-530469 A | 11/2012 |
| JP | 2012530489 A | 12/2012 |
| NO | 2006-054442 A1 | 5/2006 |
| WO | 2010/147530 A1 | 12/2010 |

OTHER PUBLICATIONS

May 13, 2014 Search Report issued in International Patent Application No. PCT/JP2014/057217.

Apr. 19, 2016 Office Action issued in Japanese Patent Application No. 2013-163645.

* cited by examiner

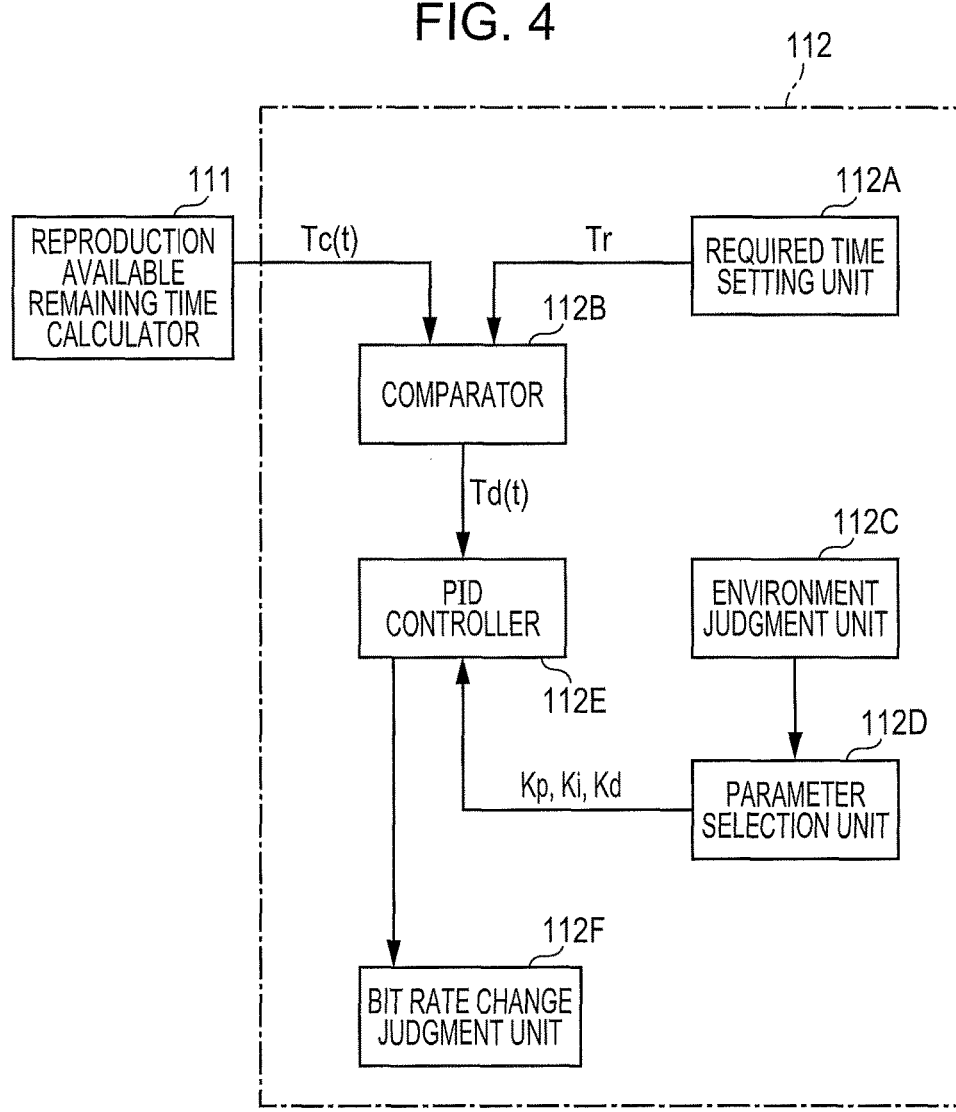

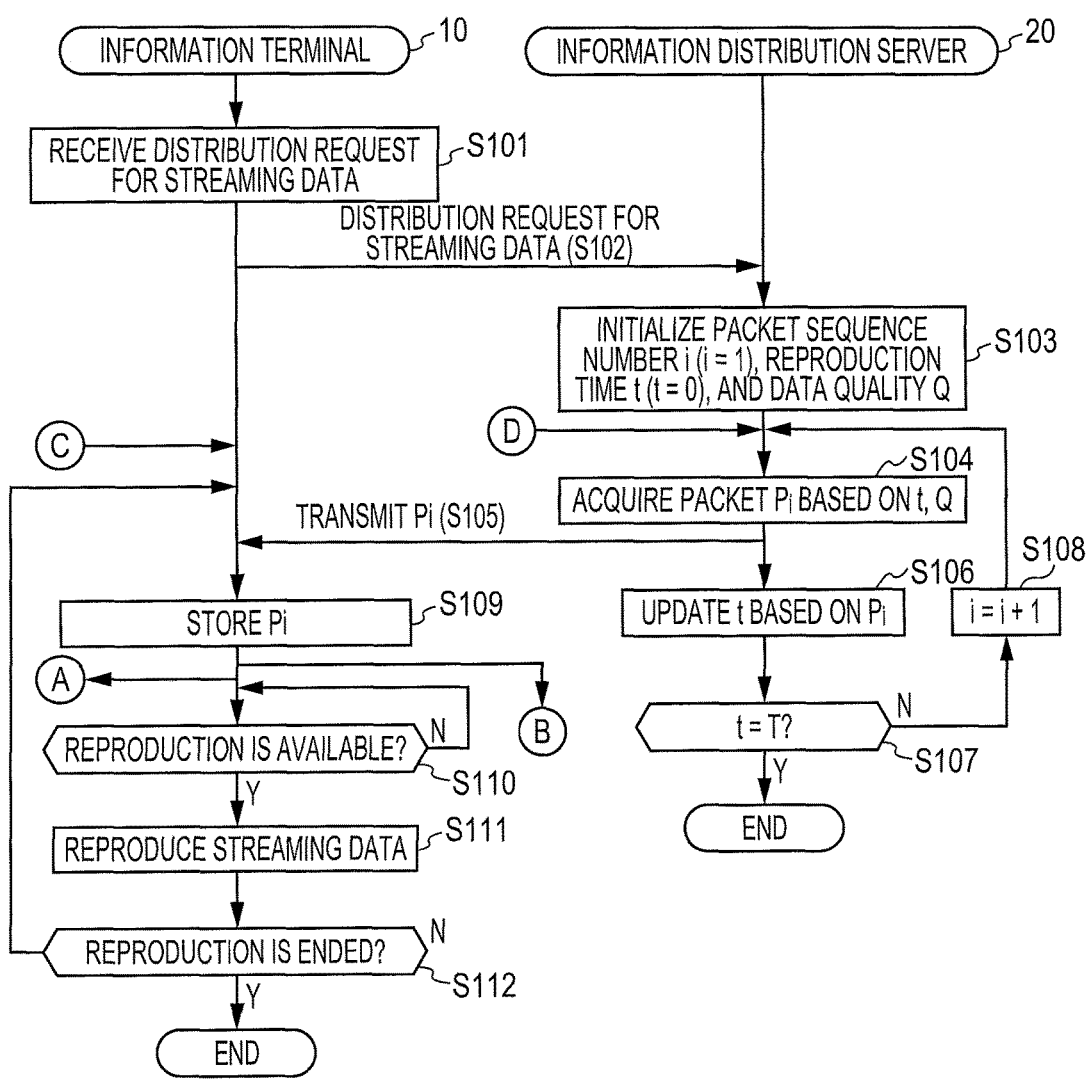

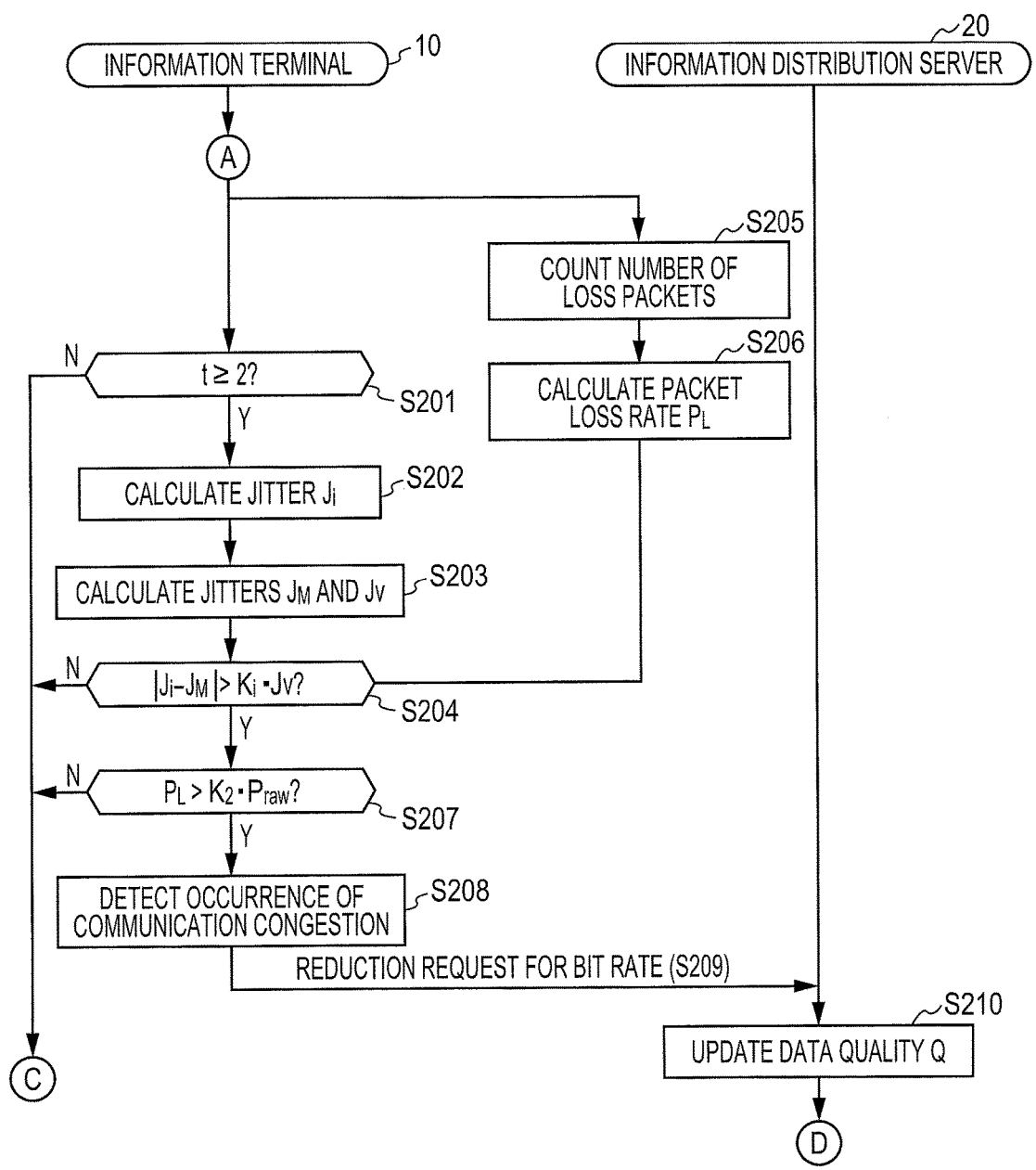

# INFORMATION PROCESSING SYSTEM, INFORMATION PROCESSING APPARATUS, AND NON-TRANSITORY COMPUTER READABLE MEDIUM

CROSS REFERENCE TO RELATED APPLICATION

This is a continuation of International Application No. PCT/JP2014/057217 filed on Mar. 18, 2014, and claims priority from Japanese Patent Application No. 2013-163645, filed on Aug. 6, 2013.

BACKGROUND

Technical Field

The present invention relates to an information processing system, an information processing apparatus, and a non-transitory computer readable medium.

SUMMARY

An aspect of the present invention provides an information processing system including an information processing apparatus and an information distribution apparatus. The information processing apparatus includes a receiving unit that successively receives a plurality of packets that configure distribution data from the information distribution apparatus; a first judging unit that judges whether or not congestion occurs in communication with the information distribution apparatus, based on a change in time interval from transmission to reception of each of the packets successively received by the receiving unit; a second judging unit that judges whether or not a packet loss rate, which is a rate of a loss packet corresponding to a loss included in the packets transmitted from the information distribution apparatus and calculated based on the packets successively received by the receiving unit, is increased as compared with a value obtained by multiplying a packet loss rate before the packets that configure the distribution data are received, by a predetermined weight; and a requesting unit that requests the information distribution apparatus to change a bit rate of the packets that configure the distribution data, based on a judgment result by the first judging unit and a judgment result by the second judging unit. The information distribution apparatus includes an updating unit that updates the bit rate of the packets that configure the distribution data, in response to the request by the requesting unit.

BRIEF DESCRIPTION OF THE DRAWINGS

Exemplary embodiment(s) of the present invention will be described in detail based on the following figures, wherein

FIG. 4 is a functional block diagram of a buffer controller;

FIG. 5 is an illustration showing an example of a bit rate threshold management table;

FIG. 6 is an illustration for describing a sequence example in the information processing system;

FIG. 7 is an illustration for describing a sequence example in the information processing system.

DETAILED DESCRIPTION

An exemplary embodiment for implementing the present invention (hereinafter, referred to as exemplary embodiment) is described below with reference to the drawings.

1. Description for System Configuration

Figure 1:
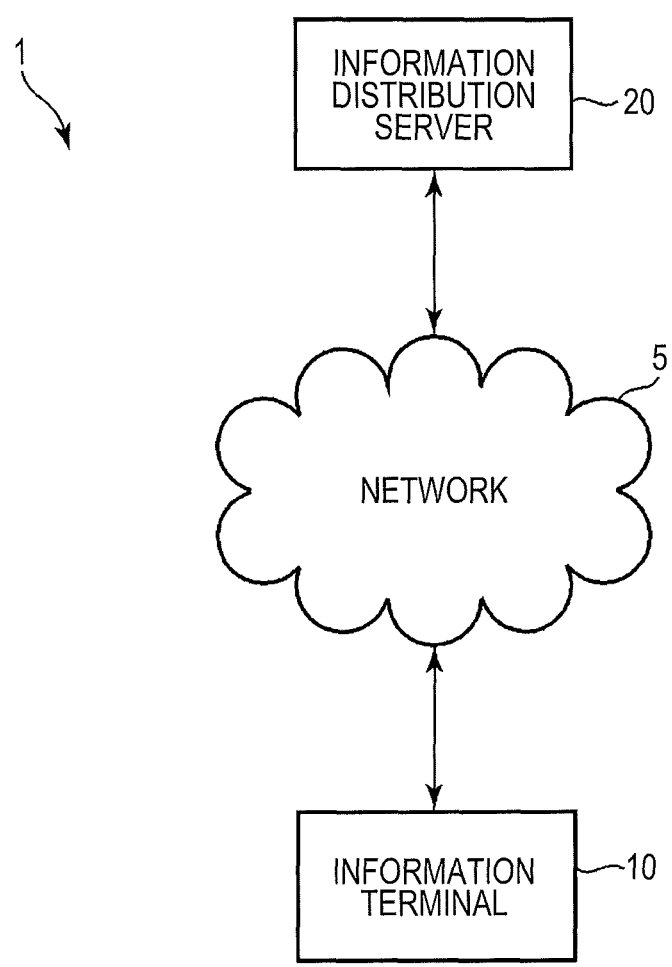
FIG. 1 is a system configuration diagram of an information processing system according to this exemplary embodiment.

FIG. 1 shows a system configuration diagram of an information processing system 1 according to this exemplary embodiment. As shown in FIG. 1, the information processing system 1 includes an information terminal 10, and an information distribution server 20. The information terminal 10 and the information distribution server 20 are connected to each other through a network 5 and hence can mutually make communication.

Described in this exemplary embodiment is processing for actively optimizing the data quality of streaming data based on packets of the streaming data successively received from the information distribution server 20 when the information terminal 10 receives distribution of the streaming data from the information distribution server 20.

2. Description for Hardware Configuration

To provide the above-described processing, an example of hardware configurations provided in the information terminal 10 and the information distribution server 20 included in the information processing system 1 is described below with reference to a hardware configuration diagram shown in FIG. 2.

2-1. Hardware Configuration of Information Terminal 10

Figure 2:
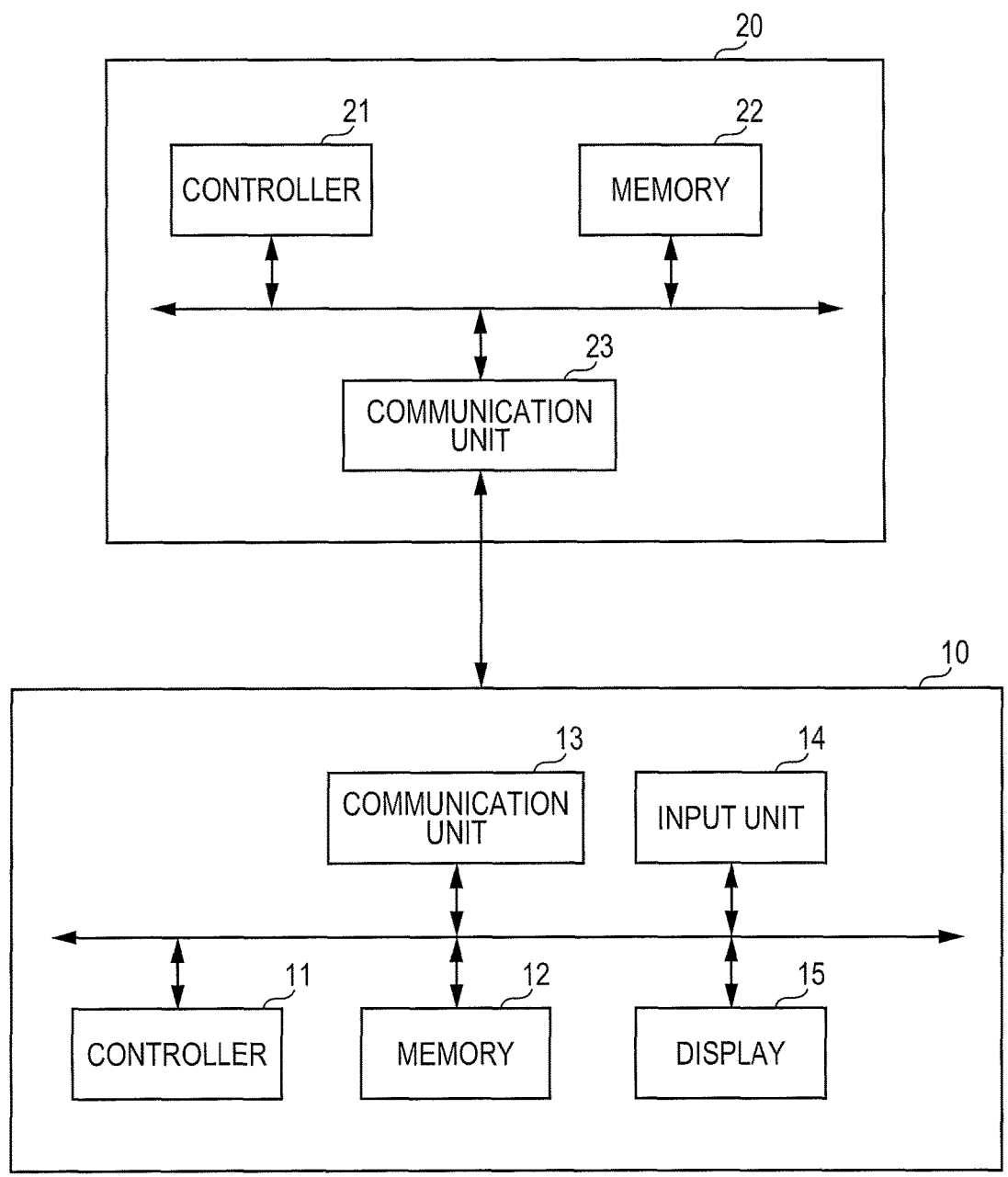
FIG. 2 is a hardware configuration diagram of an information terminal and an information distribution server.

As shown in FIG. 2, the information terminal 10 includes a controller 11, a memory 12, a communication unit 13, an input unit 14, and a display 15.

The controller 11 includes a CPU (Central Processing Unit). The controller 11 executes various arithmetic processing and controls respective units of the information terminal 10 based on a program stored in the memory 12.

The memory 12 stores a control program such as an operating system and data of the information terminal 10, and is also used as a work memory of the controller 11. The program may be previously written in the memory 12, may be supplied to the information terminal 10 in a stored state in an information storage medium, such as an optical disk, a magnetic disk, a magnetic tape, a magneto-optical disk, or a flash memory, or may be supplied to the information terminal 10 through a data communication network such as the Internet.

The communication unit 13 includes, for example, a wired or wireless communication interface. The communication unit 13 is connected to the network through the communication interface, and makes communication with the information distribution server 20 connected to the network.

The input unit 14 is provided by an input device, such as a touch panel or a keyboard. The input unit 14 receives an operation input from a user.

The display 15 is provided by a display device such as a liquid crystal display. The display 15 displays a result of information processing by the controller 11 (screen).

2-2. Hardware Configuration of Information Distribution Server 20

Next, a hardware configuration example of the information distribution server 20 is described. As shown in FIG. 2, the information distribution server 20 includes a controller 21, a memory 22, and a communication unit 23.

The controller 21 includes a CPU (Central Processing Unit). The controller 21 executes various arithmetic processing and controls respective units of the information distribution server 20 based on a program stored in the memory 22.

The memory 22 stores a control program such as an operating system and data of the information distribution server 20, and is also used as a work memory of the controller 21. The program may be supplied to the information distribution server 20 in a stored state in an information storage medium, such as an optical disk, a magnetic disk, a magnetic tape, a magneto-optical disk, or a flash memory, or may be supplied to the information distribution server 20 through data communication such as the Internet.

For example, the memory 22 may store streaming data (for example, movie data, audio data, etc.) for each of plural data qualities (for example, HD, H, MH, MLM, L, and UL in order from high quality), image data (for example, still images with different data sizes), and application data.

The communication unit 23 includes, for example, a network interface card (NIC) and is connected to the network 5 through the NIC to communicate with the information terminal 10.

3. Description for Functions Included in Information Terminal 10

Next, the details of functions included in the information terminal 10 according to this exemplary embodiment are described below with reference to FIGS. 3 and 4.

Figure 3:
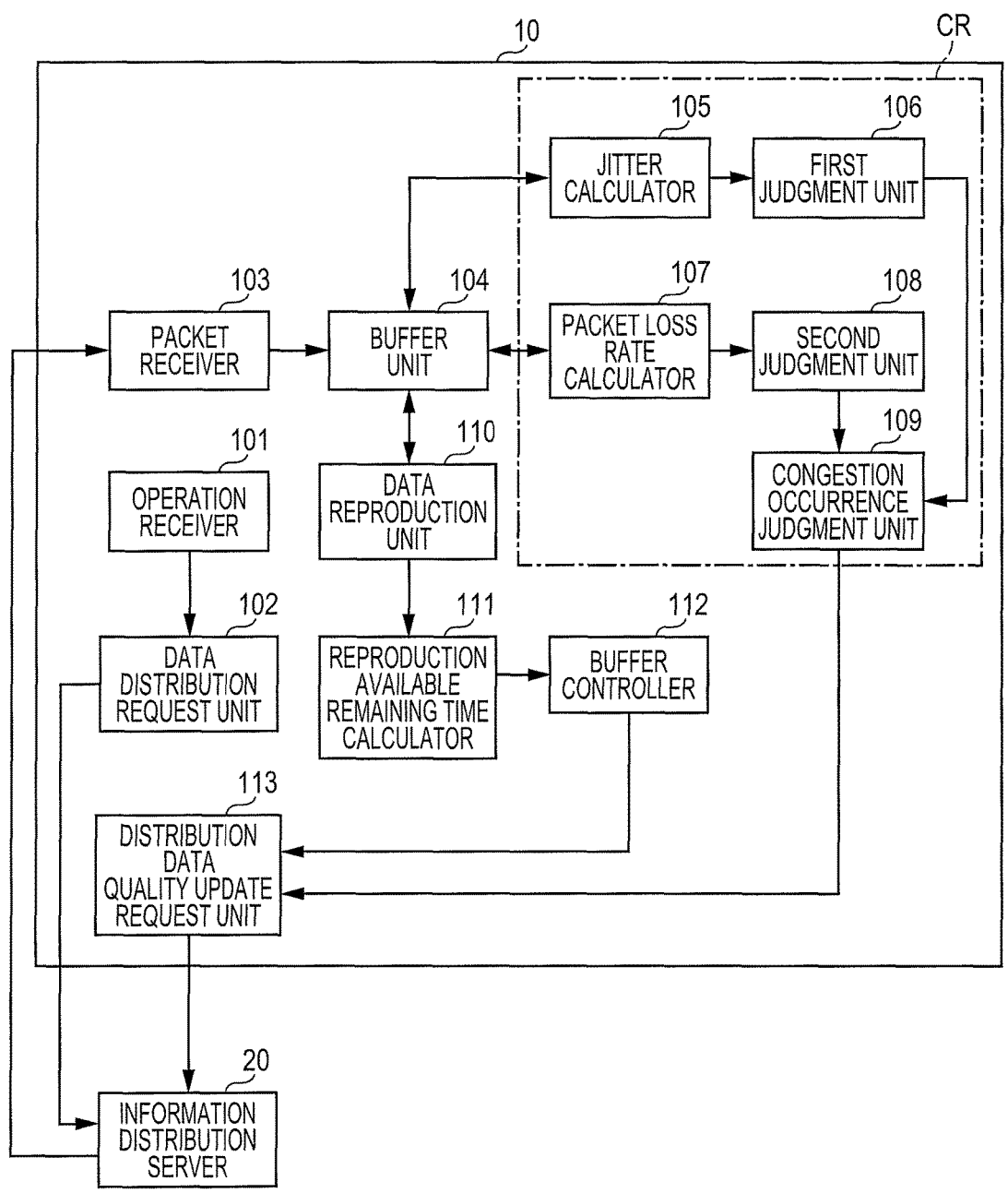
FIG. 3 is a functional block diagram of the information terminal.

FIG. 3 shows a functional block diagram of the information terminal 10. As shown in FIG. 3, the information terminal 10 includes an operation receiver 101, a data distribution request unit 102, a packet receiver 103, a buffer unit 104, a congestion occurrence detector CR, a data reproduction unit 110, a reproduction available remaining time calculator 111, a buffer controller 112, and a distribution data quality update request unit 113. The respective functions included in the information terminal 10 may be provided by the respective units of the controller 11, the memory 12, the communication unit 13, the input unit 14, and the display 15 included in the information terminal 10 shown in FIG. 2.

The operation receiver 101 receives an operation input from the user, and starts processing in accordance with the received operation input. For example, in this exemplary embodiment, the operation receiver 101 may receive designation of a data distribution source and distribution data from the user.

The data distribution request unit 102 makes a request for distribution of data designated to a data distribution source in accordance with an input received by the operation receiver 101. For example, in this exemplary embodiment, the data distribution request unit 102 may request the information distribution server 20 for streaming distribution of designated data (for example, movie data).

The packet receiver 103 receives data (packet) transmitted from a data distribution source in response to the data distribution request by the data distribution request unit 102. For example, the packet receiver 103 may successively receive plural packets that configure streaming data transmitted from the information distribution server 20.

The buffer unit 104 is a temporary memory that successively accumulates the packets successively received by the packet receiver 103.

The congestion occurrence detector CR judges whether or not congestion occurs in communication between the information distribution server 20 and the information terminal 10 based on information of the packets stored in the buffer unit 104, and detects occurrence of communication congestion based on the judgment result. The congestion occurrence detector CR includes a jitter calculator 105, a first judgment unit 106, a packet loss rate calculator 107, a second judgment unit 108, and a congestion occurrence judgment unit 109. The details of the jitter calculator 105, the first judgment unit 106, the packet loss rate calculator 107, the second judgment unit 108, and the congestion occurrence judgment unit 109 are described below.

The jitter calculator 105 calculates a delay (jitter) since reception of a packet with a previous sequence number, for each packet accumulated in the buffer unit 104. To be specific, for a packet $P_i$ (assuming that packets are transmitted in order of the sequence number) of a sequence number i (i being an integer equal to or larger than 2) of streaming data, the jitter calculator 105 calculates a jitter $J_i$ by Expression (1) as follows. Herein, $RD_i$ may be a time interval from transmission to reception of a packet $P_i$, and $RD_i$ may be calculated from a transmission time at which the packet is stored in a header and a reception time at which the packet is actually received.

$$J_i = RD_i - RD_{i-1} \tag{1}$$

Also, the jitter calculator 105 calculates a first index value $J_{Mean}$ of the jitters based on the jitters calculated for the respective packets accumulated in the buffer unit 104. For example, the first index value may be a value corresponding to a mean value (or may be a mean value) of jitters calculated for a target packet group (P1 to Pi). To be specific, the jitter calculator 105 calculates the first index value by Expression (2) as follows. It is to be noted that α may be a real number that satisfies 0<α<1.

$$J_{Mean} = (1-\alpha)J_{Mean} + \alpha J_i \tag{2}$$

Further, the jitter calculator 105 calculates a second index value $J_{Var}$ of the jitters based on the jitters calculated for the respective packets accumulated in the buffer unit 104. For example, the second index value may be a value corresponding to a variance (or may be a variance) of the jitters calculated for a target packet group (Pj (j being an integer smaller than i and equal to or larger than 1, for example, j=1) to Pi). To be specific, the jitter calculator 105 calculates the second index value by Expression (3) as follows. It is to be noted that a may be a real number that satisfies 0<α<1.

$$J_{Var} = (1-2\alpha)J_{Var} + 2\alpha|J_i - J_{Mean}| \tag{3}$$

The first judgment unit 106 judges whether a first congestion occurrence condition is satisfied or not based on the jitters calculated by the jitter calculator 105 and the index value of the jitters. To be specific, when the first congestion occurrence condition is expressed by Expression (4) as follows, the first judgment unit 106 may judge that the first congestion occurrence condition is satisfied if Expression (4) is satisfied, and otherwise may judge that the first congestion occurrence condition is not satisfied. It is to be noted that K1 may be a predetermined positive coefficient.

$$|J_i - J_{Mean}| > K1 \cdot J_{Var} \tag{4}$$

The packet loss rate calculator 107 calculates a packet loss rate relating to data distributed from the information distribution server 20 based on information of the respective packets accumulated in the buffer unit 104. For example, in the target packet group (Pj (j being an integer smaller than i and equal to or larger than 1, for example, j=1) to Pi), the packet loss rate calculator 107 may calculate a value as a packet loss rate ($P_{loss}$), the value being obtained by counting the sum (L) of the number of lost packets and the number of packets which have not reached in order of the sequence number, and dividing L by the total number (i) of transmission packets. Also, the packet loss rate calculator 107 may also previously calculate a basic packet loss rate $P_{RAW}$ before distribution of data from the information distribution server 20.

The second judgment unit 108 judges whether a second congestion occurrence condition is satisfied or not based on the packet loss rate calculated by the packet loss rate calculator 107 and the basic packet loss rate. To be specific, when the second congestion occurrence condition is expressed by Expression (5) as follows, the second judgment unit 108 may judge that the second congestion occurrence condition is satisfied if Expression (5) is satisfied, and otherwise may judge that the second congestion occurrence condition is not satisfied. It is to be noted that K2 may be a predetermined positive coefficient.

$$P_{loss} > K2 \cdot P_{RAW} \tag{5}$$

The congestion occurrence judgment unit 109 judges whether communication congestion occurs or not based on the judgment results of the first judgment unit 106 and the second judgment unit 108 while the information terminal 10 receives distribution of data from the information distribution server 20. To be specific, the congestion occurrence judgment unit 109 may judge that communication congestion occurs if the first judgment unit 106 judges that the first congestion occurrence condition is satisfied and the second judgment unit 108 judges that the second congestion occurrence condition is satisfied, and otherwise may judge that communication congestion does not occur.

The data reproduction unit 110 reproduces data based on the packets accumulated in the buffer unit 104. For example, if the information terminal 10 receives streaming distribution of multimedia data (for example, video data) from the information distribution server 20, streaming reproduction of the multimedia data may be executed based on the packets accumulated in the buffer unit 104. At this time, the data reproduction unit 110 may execute data reproduction if there is a predetermined amount of packets, which are accumulated in the buffer unit 104 and are not reproduced yet, and may become a standby state for data reproduction if there is not the predetermined amount of packets, which are accumulated in the buffer unit 104 and are not reproduced yet.

The reproduction available remaining time calculator 111 calculates a remaining time available for reproduction (reproduction available remaining time) with the packets accumulated in the buffer unit 104. For example, the reproduction available remaining time calculator 111 may calculate a reproduction available time with packets which are not reproduced yet by the data reproduction unit 110 among the packets accumulated in the buffer unit 104, as a reproduction available remaining time. To be specific, a reproduction available remaining time (Tc(t)=PL(t)/FR(t)) may be calculated by dividing a length PL(t) of a buffer available for reproduction at a time t by a frame rate (FR(t)).

The buffer controller 112 controls the quality of the distribution data based on the reproduction available remaining time calculated by the reproduction available remaining time calculator 111. The detailed configuration of the buffer controller 112 is described with reference to FIG. 4.

As shown in FIG. 4, the buffer controller 112 includes a required time setting unit 112A, a comparator 112B, an environment judgment unit 112C, a parameter selection unit 112D, a PID controller 112E, and a bit rate change judgment unit 112F.

The required time setting unit 112A sets a required time (Tr) of the reproduction available remaining time. For example, the required time may be previously determined as an initial value, or may be set in accordance with an input by the user.

The comparator 112B compares the reproduction available remaining time Tc(t) at the time t calculated by the reproduction available remaining time calculator 111 with the required time Tr. For example, the comparator 112B may calculate a difference Td(t) between the reproduction available remaining time Tc(t) and the required time Tr by Expression (6) as follows, or may calculate Td(t) with regard to a control time $T_{control}$ by Expression (7). It is to be noted that the control time $T_{control}$ may be calculated by Expression (8). RTT indicates a roundtrip time, $T_{enc}$ indicates a time required for encoding of a packet, and $T_{dec}$ indicates a time required for decoding.

$$Td(t)=Tc(t)-Tr \tag{6}$$

$$Td(t)=Tc(t)-Tr-T_{control} \tag{7}$$

$$T_{control}=RTT/(1-P_{loss})+T_{enc}+T_{dec} \tag{8}$$

The environment judgment unit 112C judges the communication environment of the information terminal 10. For example, when the information terminal 10 executes wireless communication, the environment judgment unit 112C may judge whether a communication state with a wireless communication target is a state (profile 1) in which a communication antenna is likely changed (for example, during moving at high speed), a state (profile 2) with stable communication, and a state (profile 3) in which the communication state is likely changed, in accordance with the communication state with the wireless communication target.

The parameter selection unit 112D selects a parameter corresponding to the profile judged by the environment judgment unit 112C. For example, the information terminal 10 may hold a parameter set of Kp, Ki, and Kd for each profile of the communication state (profiles 1 to N (N being an integer equal to or larger than 2), and may select a corresponding parameter set of Kp, Ki, and Kd based on the profile judged by the environment judgment unit 112C.

The PID controller 112E executes PID control based on the parameter set of Kp, Ki, and Kd selected by the parameter selection unit 112D and the data (Td(t)) output from the comparator 112B. To be specific, the PID controller 112E calculates a PID evaluation value V(t) by Expression (9) as follows, based on the parameter set of Kp, Ki, and Kd, Td(t) which is the comparison result between the reproduction available remaining time Tc(t) at the time t and the required time Tr, an integrated value relating to Td(t) within M (M being a real number larger than 0) seconds from the time t, and a differential value relating to Td(t) within the M seconds from the time t.

$$V(t)=KpTd(t)+Ki\Sigma_M Td(t)+Kd\Delta_M Td(t) \tag{9}$$

The bit rate change judgment unit 112F judges whether the bit rate is required to be changed or not based on the PID evaluation value V(t) calculated by the PID controller 112E. For example, the bit rate change judgment unit 112F judges the necessity or non-necessity of the change of the bit rate based on the comparison result between the PID evaluation value V(t) calculated by the PID controller 112E and a threshold of at least one bit rate selected in accordance with the current bit rate. A specific example of bit rate change judgment processing by the bit rate change judgment unit 112F is described with reference to a bit rate threshold management table shown in FIG. 5.

The bit rate threshold management table shown in FIG. 5 stores, for each current bit rate, a threshold of other at least one bit rate. The other bit rate (changed bit rate) is specified by the current bit rate and the range of the PID evaluation value. For example, when the current bit rate is 800 Kbps, the bit rate change judgment unit 112F does not change the bit rate if the PID evaluation value is smaller than 3.5, changes the bit rate to 1200 Kbps if the PID evaluation value is 8.5 or larger and smaller than 8.7, and changes the bit rate to 2000 Kbps if the PID evaluation value is 8.7 or larger. Also, when the current bit rate is 1200 Kbps, the bit rate change judgment unit 112F changes the bit rate to 800 Kbps if the PID evaluation value is smaller than −2.2, does not change the bit rate if the PID evaluation value is −2.2 or larger and smaller than 5.6, and changes the bit rate to 2000 Kbps if the PID evaluation value is 5.6 or larger.

The distribution data quality update request unit 113 requests the information distribution server 20 to update the quality of data being distributed, based on the judgment results of the congestion occurrence judgment unit 109 and the bit rate change judgment unit 112F. For example, the distribution data quality update request unit 113 may request the information distribution server 20 to reduce the quality of the distribution data to be lower than the current bit rate if the congestion occurrence judgment unit 109 judges that communication congestion occurs. Also, if the bit rate change judgment unit 112F makes judgment to change the bit rate, the distribution data quality update request unit 113 may request the information distribution server 20 to change the quality of the distribution data to the changed bit rate judged by the bit rate change judgment unit 112F.

4. Description for Sequence

Next, the details of processing that is executed by the information processing system 1 are described with reference to sequence diagrams and flowcharts shown in FIGS. 6 to 8.

As shown in FIG. 6, when the information terminal 10 receives a distribution request for streaming data (distribution data) from a user (S101), the information terminal 10 requests the information distribution server 20, which is a distribution source of the streaming data, to distribute the streaming data (S102).

When the information distribution server 20 receives the distribution request from the information terminal 10, the information distribution server 20 executes initialization by setting a packet sequence number i at 1, a reproduction time t at 0, and a data quality Q at an initial value, for the streaming data corresponding to the distribution request (S103).

Then, the information distribution server 20 acquires a packet $P_i$ (S104) obtained by encoding data part (UDP) based on the reproduction time t and the data quality Q for the streaming data to be distributed (S104), and transmits the packet $P_i$ to the information terminal 10 (S105). It is to be noted that the information distribution server 20 may generate the packet $P_i$ by encoding movie data for the reproduction time t in the streaming data according to the data quality Q. Also, the information distribution server 20 may transmit the packet $P_i$ with information of the transmission time and the data quality (bit rate) added to the packet $P_i$.

The information distribution server 20 updates the reproduction time t based on the transmitted packet $P_i$ (S106). If the reproduction time t does not reach a reproduction end time T of the streaming data (S107: N), the information distribution server 20 increments i (by adding 1) (S108), returns to S104, and repeats the subsequent processing. If the reproduction time t reaches the reproduction end time T of the streaming data (S108: Y), the information distribution server 20 ends the processing.

Also, the information terminal 10 receives the packet $P_i$ transmitted from the information distribution server 20, and stores the received packet $P_i$ in the buffer (S109).

If reproduction of the streaming data is not available based on the packet stored in the buffer (S110: N), the information terminal 10 becomes a standby state. If reproduction of the streaming data is available based on the packet stored in the buffer (S110: Y), the information terminal 10 executes reproduction of the streaming data (S111). If the reproduction is not ended (S112: N), the information terminal 10 returns to S109 and repetitively executes the subsequent processing.

Also, the information terminal 10 executes update judgment for the quality of the streaming data and update request processing based on the result of the update judgment, based on the information of the packet stored in the buffer, in parallel to the reproduction of the data based on the packet stored in the buffer. The details of the update judgment processing and the update request processing of the streaming data are described with reference to sequence diagrams shown in FIGS. 7 and 8. First, an example of data quality update processing based on the judgment of communication congestion shown in FIG. 7 is described.

As shown in FIG. 7, when the packet $P_i$ is stored in the buffer in S109 in FIG. 6, if i is not 2 or larger (S201: N), the information terminal 10 returns to a state before S109 in FIG. 6, and if i is 2 or larger (S201: Y), the information terminal 10 calculates a jitter $J_i$ based on the packet $P_i$ and a packet $P_{i-1}$ (S202), and calculates jitters $J_M$ ($J_{Mean}$) and $J_v$ ($J_{Var}$) (S203). The jitter $J_i$, and the jitters $J_M$ ($J_{Mean}$) and $J_v$ ($J_{Var}$) may be calculated by the above-described jitter calculator 105.

Then, based on the calculated jitter $J_i$, and jitters $J_M$ ($J_{Mean}$) and $J_v$ ($J_{Var}$), if $|J_i-J_M|>K1\cdot J_v$ is not satisfied (S204: N), the information terminal 10 returns to a state before S109 in FIG. 6, and if $|J_i-J_M|>K1\cdot_v$ is satisfied (S204: Y), the information terminal 10 goes to S207.

Also, when the packet $P_i$ is stored in S109 in FIG. 6, the information terminal 10 counts the number of loss packets from P1 to Pi (S205), and calculates a packet loss rate PL based on the counted number of loss packets (S206). The packet loss rate $P_L$ ($P_{Loss}$) may be calculated by the above-described packet loss rate calculator 107.

Then, in S207, if the packet loss rate $P_L$ calculated in S206 does not satisfy $P_L>K2\cdot P_{RAW}$ (S207: N), the information terminal 10 returns to a state before S109 in FIG. 6. If the packet loss rate $P_L$ satisfies $P_L>K2\cdot P_{RAW}$ (S207: Y), the information terminal 10 detects occurrence of communication congestion between the information terminal 10 and the information distribution server 20 (S208), and requests the information distribution server 20 to reduce the bit rate (S209).

When the information distribution server 20 receives the reduction request for the bit rate from the information terminal 10, the information distribution server 20 updates the data quality Q of the streaming data being distributed, to be lower than the current data quality (S210), returns to S104 in FIG. 6, and executes the subsequent processing.

The above-described example is the example for the data quality update processing based on the judgment of communication congestion. Next, an example of data quality update processing based on the reproduction available remaining time is described with reference to FIG. 8.

Figure 8:
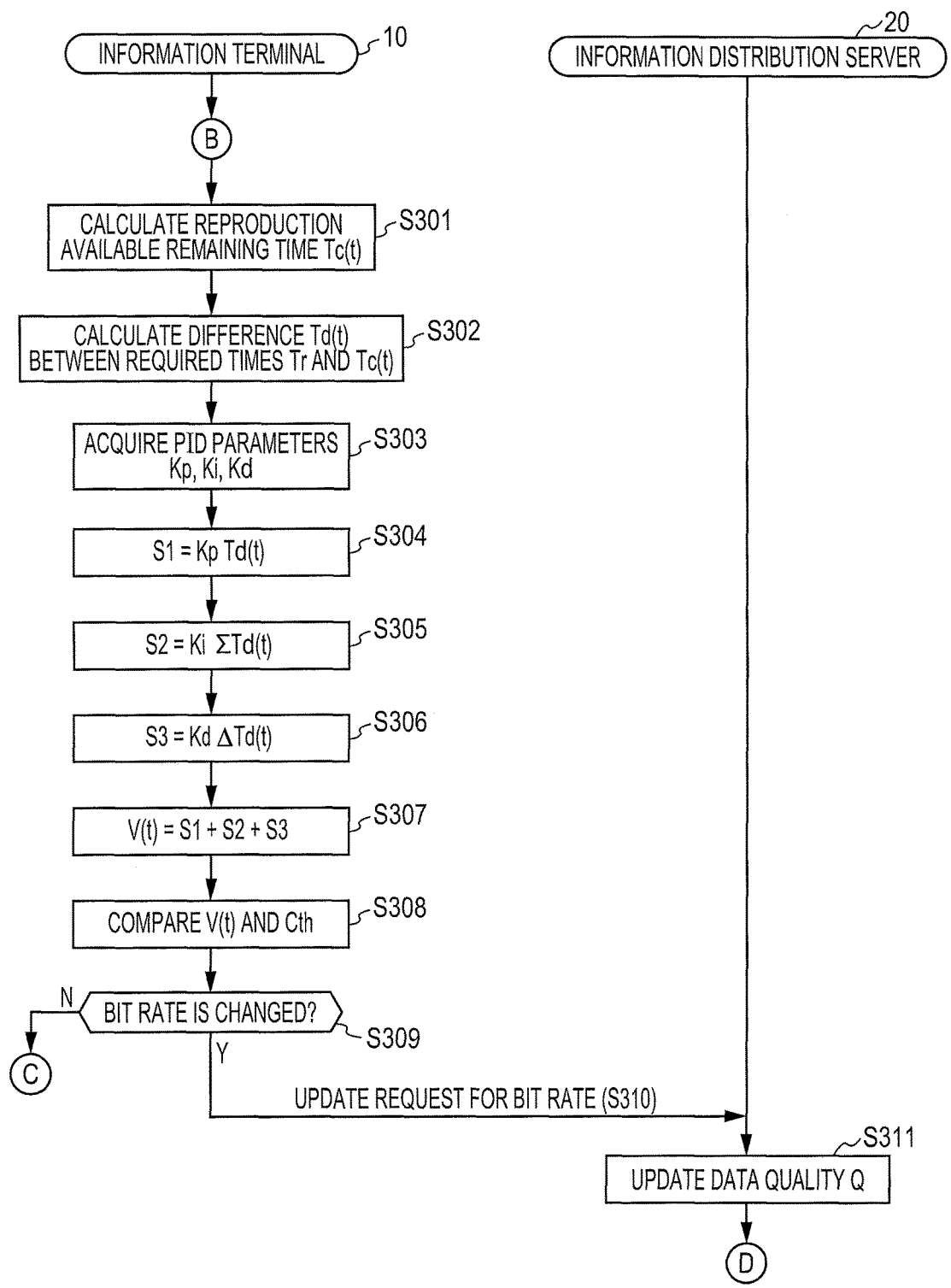
FIG. 8 is an illustration for describing a sequence example in the information processing system.

As shown in FIG. 8, when the packet P; is stored in the buffer in S109 in FIG. 6, the information terminal 10 calculates a reproduction available remaining time Tc(t) based on information of the packet stored in the buffer (S301), and calculates Td(t) based on the difference between a required time Tr of a previously set reproduction available remaining time and the reproduction available remaining time Tc(t) (S302). The reproduction available remaining time Tc(t) and Td(t) may be calculated by the above-described reproduction available remaining time calculator 111 and the comparator 112B.

Then, the information terminal 10 acquires PID parameters Kp, Ki, and Kd in accordance with the communication state of the information terminal 10 (S303), calculates a first evaluation value S1 based on Kp and Td(t) (S304), calculates a second evaluation value S2 based on Ki and Td(t) (S305), and a third evaluation result S3 based on Kd and Td(t) (S306), and calculates a PID evaluation value V(t) as V(t)=S1+S2+S3 (S307). It is to be noted that the PID evaluation value V(t) may be calculated by the above-described PID controller 112E.

The information terminal 10 compares the PID evaluation value V(t) with a threshold Cth of other bit rate based on the current bit rate (S308), and judges whether the bit rate is changed or not based on the comparison result (S309). The judgment processing for the change of the bit rate may be executed by the bit rate change judgment unit 112F. Then, if the bit rate is not changed (S309: N), the information terminal 10 returns to a state before S109 in FIG. 6, and if the bit rate is changed (S309: Y), the information terminal 10 requests the information distribution server 20 for update of the bit rate (S310).

When the information distribution server 20 receives the update request for the bit rate from the information terminal 10, the information distribution server 20 updates the data quality Q of the streaming data being distributed (S311) in response to the received update request, returns to S104 in FIG. 6, and executes the subsequent processing.

The above-described example is the example for the data quality update processing based on the reproduction available remaining time. With the above-described sequence, the information processing system 1 actively updates the data quality based on the congestion state of communication and the state of the reproduction available remaining time during data distribution, and hence can prevent data reproduction from being interrupted.

Also, the present invention is not limited to the above-described exemplary embodiment. For example, in the above-described exemplary embodiment, the information terminal 10 may receive a test packet from the information distribution server 20 before the information terminal 10 receives distribution of streaming data from the information distribution server 20, and may set an initial value of the data quality based on the received test packet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an information processing apparatus and an information distribution apparatus,
wherein the information processing apparatus includes
a receiving unit that successively receives a plurality of packets that configure distribution data from the information distribution apparatus,
a first judging unit that judges whether or not congestion occurs in communication with the information distribution apparatus, based on a change in time interval from transmission to reception of each of the packets successively received by the receiving unit,
a second judging unit that judges whether or not a packet loss rate, which is a rate of a loss packet corresponding to a loss included in the packets transmitted from the information distribution apparatus and calculated based on the packets successively received by the receiving unit, is increased as compared with a value obtained by multiplying a packet loss rate before the packets that configure the distribution data are received, by a predetermined weight, and
a requesting unit that requests the information distribution apparatus to change a bit rate of the packets that configure the distribution data, based on a judgment result by the first judging unit and a judgment result by the second judging unit, and
wherein the information distribution apparatus includes
an updating unit that updates the bit rate of the packets that configure the distribution data, in response to the request by the requesting unit.

2. The information processing system according to claim 1,
wherein the information processing apparatus further includes
a jitter calculating unit that calculates a difference between a time interval from transmission to reception of a packet and a time interval from transmission to reception of a packet transmitted before the former packet, as a jitter, for each of the packets successively received by the receiving unit, and
wherein the first judging unit judges that the congestion occurs in the communication with the information distribution apparatus if an increase of a jitter of a packet newly received by the receiving unit with respect to a jitter of a packet received in the past by the receiving unit satisfies a predetermined condition.

3. The information processing system according to claim 1, wherein the requesting unit requests the information distribution apparatus to change the bit rate of the packets that configure the distribution data to a lower bit rate than a current bit rate if the first judging unit judges that the congestion occurs in the communication, and if the second judging unit judges that the packet loss rate, which is the rate of the loss packet corresponding to the loss included in the packets transmitted from the information distribution apparatus, is increased as compared with the value obtained by multiplying the packet loss rate before the packets that configure the distribution data are received, by the predetermined weight.

4. The information processing system according to claim 1, wherein the information processing apparatus further includes
  a storing unit that stores the packets successively received by the receiving unit, in a storage,
  a reproducing unit that reproduces the packets stored in the storage,
  a calculating unit that calculates a reproduction available remaining time, which is a remaining time available for reproduction with packets not reproduced yet by the reproducing unit among the packets stored in the storage, and
  a bit rate change judging unit that judges whether or not the bit rate of the packets that configure the distribution data is changed, based on a difference between the reproduction available remaining time and a predetermined required time, and
wherein the requesting unit requests the information distribution apparatus to change the bit rate of the packets that configure the distribution data, based on a judgment result by the bit rate change judging unit.

5. The information processing system according to claim 4,
wherein the information processing apparatus further includes
  a difference time calculating unit that calculates a difference time based on the difference between the reproduction available remaining time and the predetermined required time, and
  an evaluation value calculating unit that calculates an evaluation value, based on the difference time and a proportional coefficient, an amount of change of the difference time and a differential coefficient in a predetermined time range, and a cumulative value of the difference time and an integration constant in a predetermined time range, and
wherein the bit rate change judging unit judges the change of the bit rate, based on the evaluation value calculated by the evaluation value calculating unit and an evaluation value range determined for each bit rate.

6. An information processing apparatus comprising:
a receiving unit that successively receives a plurality of packets that configure distribution data from an information distribution apparatus;
a first judging unit that judges whether or not congestion occurs in communication with the information distribution apparatus, based on a change in time interval from transmission to reception of each of the packets successively received by the receiving unit;
a second judging unit that judges whether or not a packet loss rate, which is a rate of a loss packet corresponding to a loss included in the packets transmitted from the information distribution apparatus and calculated based on the packets successively received by the receiving unit, is increased as compared with a value obtained by multiplying a packet loss rate before the packets that configure the distribution data are received, by a predetermined weight; and
a requesting unit that requests the information distribution apparatus to change a bit rate of the packets that configure the distribution data, based on a judgment result by the first judging unit and a judgment result by the second judging unit.

7. A non-transitory computer readable medium storing a program causing a computer to function as:
a receiving unit that successively receives a plurality of packets that configure distribution data from an information distribution apparatus;
a first judging unit that judges whether or not congestion occurs in communication with the information distribution apparatus, based on a change in time interval from transmission to reception of each of the packets successively received by the receiving unit;
a second judging unit that judges whether or not a packet loss rate, which is a rate of a loss packet corresponding to a loss included in the packets transmitted from the information distribution apparatus and calculated based on the packets successively received by the receiving unit, is increased as compared with a value obtained by multiplying a packet loss rate before the packets that configure the distribution data are received, by a predetermined weight; and
a requesting unit that requests the information distribution apparatus to change a bit rate of the packets that configure the distribution data, based on a judgment result by the first judging unit and a judgment result by the second judging unit.

* * * * *